Oct. 26, 1954 S. B. COHN 2,692,984
BRIDGE OBSTRUCTION MARKER FOR RADAR NAVIGATION
Filed Aug. 30, 1950 2 Sheets-Sheet 1
Fig. 1.
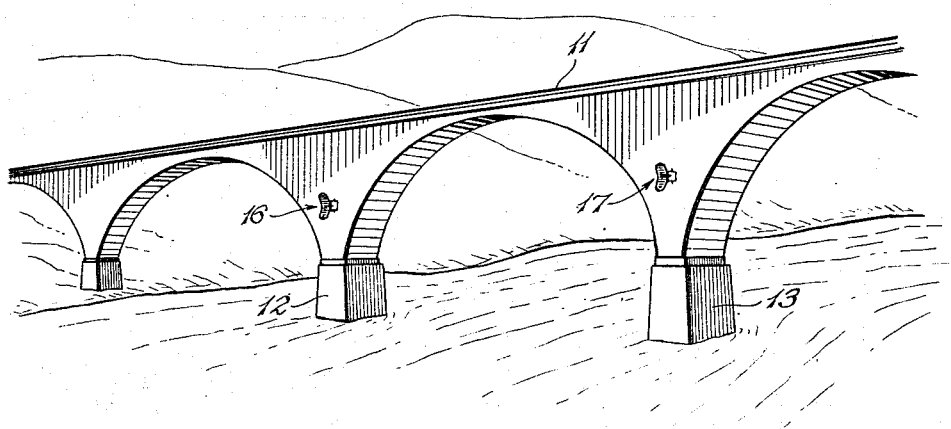
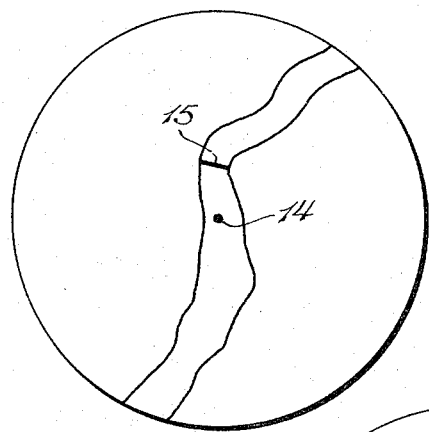
Fig. 2.
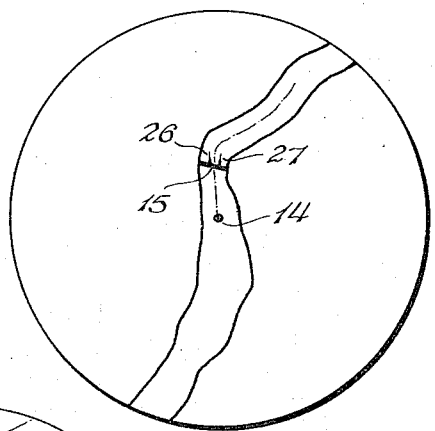
Fig. 3.
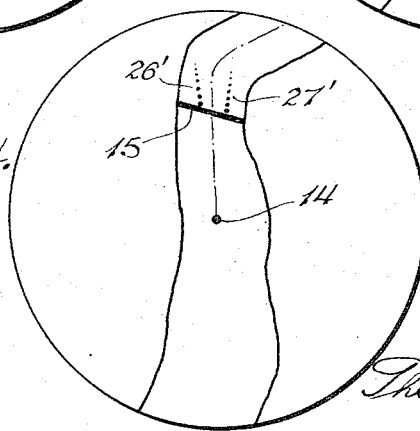
Fig. 4.
INVENTOR
SEYMOUR B. COHN
BY
Thomas M. Ferrill, Jr.
ATTORNEY Oct. 26, 1954 S. B. COHN 2,692,984
BRIDGE OBSTRUCTION MARKER FOR RADAR NAVIGATION
Filed Aug. 30, 1950 2 Sheets-Sheet 2

INVENTOR
SEYMOUR B. COHN
BY Thomas M. Ferrill, Jr.
ATTORNEY

Patented Oct. 26, 1954

2,692,984

UNITED STATES PATENT OFFICE 2,692,984

BRIDGE OBSTRUCTION MARKER FOR RADAR NAVIGATION

Seymour B. Cohn, Flushing, N. Y., assignor to The Sperry Corporation, a corporation of Delaware Application August 30, 1950, Serial No. 182,366

6 Claims. (Cl. 343—5)

The present invention relates to radar navigation aids, and is particularly concerned with apparatus for enabling radar units on boats to depict the positions of piers and like obstructions beneath bridges.

As is well known, marine radar installations have achieved wide recent acceptance in oceangoing vessels, in lake steamers and tow boats, and in river boats and tugs. In all of these services, they have made operation materially safer, and furthermore, they have made feasible the operation of the craft during conditions of obscured visibility due to dense fog and other adverse weather conditions.

The marine radar system provides the skipper with a map-like picture scalarly representing shore lines, wharves, breakwaters, islands, and other craft, and showing his own position relative thereto, as centrally located on the picture. The reliance upon radar as a basis for river navigation has been severely cramped, however, due to inability to show the positions of bridge piers, to guide the skipper in steering a clear passage therebetween as he approached and passed under bridges. On the radar oscilloscope picture, a bridge with piers thereunder appears just as a luminous straight line, with no projections or intensity gradations to denote the pier positions. Consequently, river boat skippers have had the experience of navigating an appreciable distance in dense fog in reliance on radar, until a bridge was approached, and having to drop anchor short of the bridge and wait for a clearing in order to ascertain how to proceed to pass safely beneath the bridge.

An object of the present invention is to provide apparatus on bridges for so returning microwave energy to a radar unit on an approaching craft as to enable its operator to see distinct pier demarcations on the radar picture oscilloscope, and thus to navigate the craft under and beyond the bridge, safely clearing the piers and any other marked obstructions.

In accordance with the present invention, at least one energy receiving and retransmitting device is provided on the bridge at a significant position thereon, and arranged for retransmitting an appreciable amount of received radar pulse energy in such a way as to produce a significant mark on the radar oscilloscope in the approaching craft. Preferably, one such receiving and retransmitting unit is provided for each of a plurality of bridge piers, to make plural demarcations on the radar picture, between two of which the skipper can navigate his craft. For example, one marker unit may be placed at each of two piers between which the principal navigation channel passes, so that the skipper can judge not only the positions of the piers but also the best course for his craft between the piers, e. g., the course to the right of the center line therebetween.

The receiving and retransmitting apapratus is made to be entirely passave, so that no power supply requirements are imposed thereon. Not only does this result in maximum simplicity of the installation, but moreover, it brings about great economy, and the reliability of entire freedom from electronic parts. Thus, maintenance problems are reduced to the minimum.

A special type of "echo box" is provided for use with a microwave antenna having special directive properties, and the feed system intercoupling the antenna and the echo box is so arranged as to provide a very high energization level in the echo box resulting from the extremely short transmitted pulses, the energy exit thereafter from the echo box by retransmission through the directive antenna being also of relatively short duration, but being of high initial intensity.

Fig. 1 illustrates the installation of two such receiving and retransmitting units at respective piers of a river bridge;

Fig. 2 is a representation of a radar picture typical of those provided on river boat radars by a bridge of the multi-pier type, in the absence of special pier marker equipment;

Fig. 3 is a radar picture such as is provided by the use of a pair of pier markers as in Fig. 1;

Fig. 4 is a corresponding radar picture provided when the craft has approached relatively close to the bridge, the radar picture scale being expanded;

Fig. 1 illustrates a bridge 11 having several piers, including piers 12 and 13 between which the river depth is sufficient for navigation. It has been found that the typical marine radar system with its P. P. I. type of presentation (plan position indication) ordinarily is unable to provide any contrast either in bridge outline or in intensity at the points on the bridge image corresponding to location of the piers such as piers 12 and 13. Fig. 2 represents a typical marine radar picture as seen from a boat (represented by the central point 14), as it approaches the bridge which is represented by the luminous line 15, this figure being illustrative of the lack of any distinct indications of the piers.

Figure 5:
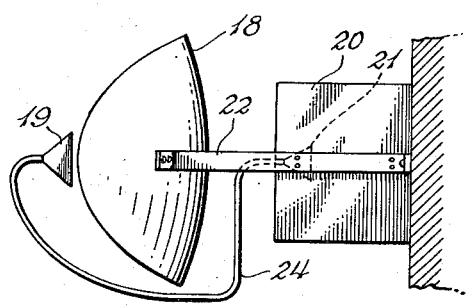
Figs. 5, 6 and 7 are plan, side elevation and front elevation views, respectively, of a marker unit according to the present invention including the directive antenna and the special echo box associated therewith.
Figure 6:
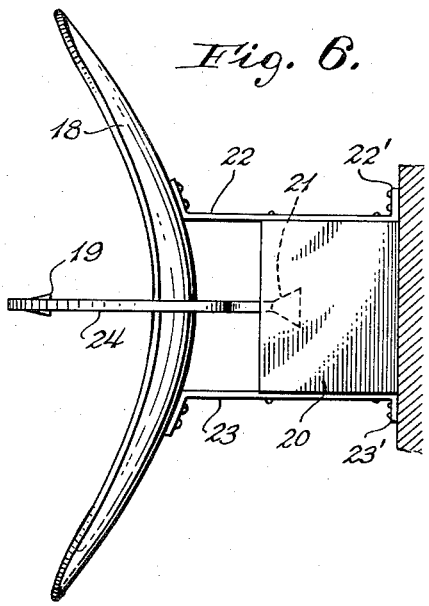
Figure 7:
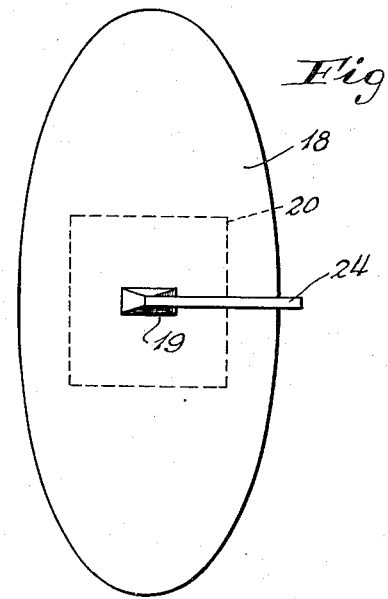

In accordance with the present invention, a special marker energy retransmission unit 16 is provided on the bridge 11 at the location of pier 12, and another marker energy retransmission unit 17 is provided on the bridge at the location of pier 13. Each of these marker units comprises a directive antenna system and an echo box coupled thereto, the echo box having a large-aperture energy coupler for rapid energy build-up therein, and for correspondingly rapid exit of the energy following impingement on the antenna of a transmitted radar pulse, the marker energy retransmission units being constructed as shown in Figs. 5, 6 and 7.

The directive antenna comprises a reflector 18 formed according to a section of a paraboloid, and having a height appreciably greater than its breadth. This antenna is so arranged as to provide appreciable concentration of the energy in a beam having great compactness as viewed in the vertical-plane section, but having appreciably greater angular extent in the horizontal-plane section to provide for appreciable azimuthal spread, so that the system will be sufficiently effective not only for vessels approaching precisely along the river channel, but also for vessels approaching from the right or left of the channel.

An electromagnetic horn feed unit 19 is provided with its aperture located substantially at the focus of the reflector 18, the flare and aperture dimensions of the horn 19 being arranged for close concentration of its energy in the horizontal plane and for a broader pattern in the vertical plane for optimum illumination of the reflector 18. For this purpose, the width of the horn feed unit 19 exceeds its height.

The echo box comprises a metallic shell 20 having substantially rectangular sides, the length, width, and breadth dimensions of the box each preferably being somewhat different from the others, for the desired frequency response characteristics therein. A set of three dimensions such as 11 inches, 12 inches, and 13 inches may be employed in the box, for a volume of the order of 1 cubic foot, and for an unloaded Q ($Q_0$) of the order of 100,000, in its responsiveness to 3-centimeter wave energy.

With such dimensions, the box is responsive to any frequency within a very wide band including 10,000 megacycles, and hence will respond to radar energy and provide retransmission after receipt of a pulse thereof, from variously tuned radar equipments. This is essential, for a requirement of attuning the metallic box to an individual radar equipment would largely defeat its purpose.

The energy coupler for the box 20 preferably comprises a horn unit 21, having an aperture of a size which is appreciable relative to the volume enclosed by the box 20, the size of this aperture being sufficient for rapid high level energization of the box 20, with accompanying relatively fast energy exit therefrom. For an echo box of the dimensions as mentioned above, for response to 3-centimeter radar systems, the horn 21 is advantageously provided with an aperture having an area of the order of 6 or 8 square inches.

The horn feed unit 19 for the paraboloidal reflector 18 is at one end of a wave guide 24, the other end thereof being at horn 21 in the box 20. The wave guide 24 preferably is of rectangular cross section with its larger cross-sectional dimension vertical, for accommodation of the horizontally polarized radar energy, a suitable set of internal cross-sectional dimensions for this wave guide being one-half inch by one inch.

The computations on which a box for the present purpose is based will now be set forth. A loaded Q of the order of 10,000, for a frequency of 10,000 megacycles per second (3 centimeters), gives a "ringing time" of approximately .3 microsecond—the time for the emerging signal strength to decrease by a factor of $$\frac{1}{e}$$

after cessation of reception of the radar pulse. For high efficiency, the unloaded $Q(Q_0)$ of the box should be several times higher than its loaded Q, a $Q_0$ of 100,000 being ample. For the skin depth of conduction in copper sheet at 3 centimeters and an average edge dimension of 12 inches of the box, a value of $Q_0$ of the order of 100,000 is obtained, which is ample.

The loaded Q ($Q_L$) of the order of 10,000 may be obtained with the one cubic foot box by fixing the area of an energy coupling wave guide aperture therein according to the approximate formula $$Q_L = \frac{50V}{\sigma\lambda} \cong 19,000$$

where V is the volume enclosed by the box, $\sigma$ is the apertured area, and $\lambda$ is the wavelength. For the wavelength $\lambda$ of 3 centimeters and a volume of approximately 27,000 cubic centimeters, the value of $\sigma$ is found to be in the order of 6 to 8 square inches.

Means such as formed metal connecting straps 22 and 23 may be provided for rigidly attaching the antenna to the echo box, and such means may, if desired, include mounting feet 22', 23' for attachment of the box and antenna system to the bridge.

Figure 8:
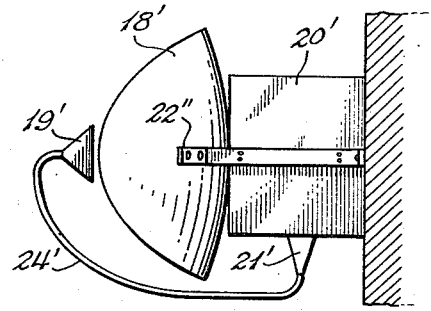
Figs. 8, 9 and 10 are plan view, side elevation and front elevation, respectively, of a modified embodiment of the microwave radar energy reception and retransmission unit.
Figure 10:
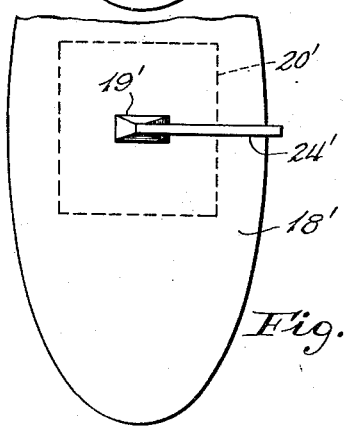
Figure 9:
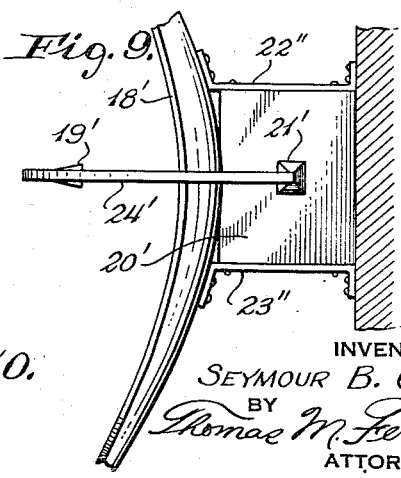

A slightly modified version of the microwave radar energy reception and retransmission unit is shown in Figs. 8, 9 and 10. Primed reference characters are used for the paraboloidal section reflector, the feed horn, the hollow box, and the wave guide system, to make readily apparent the correlation between these elements and the respective elements of Figs. 5, 6 and 7.

In the structure of Figs. 8–10, the energy coupling to the box 20' is made to the side thereof, permitting the reflector to be positioned directly in contact with the front wall of the box. If desired, a portion of the rear surface of the reflector could serve as part or all of the front wall of the box. The coupling to the box 20' is here illustrated as comprising a tapered wave guide portion 21' communicating with the box through a relatively large aperture directly in the side wall thereof. As is shown in Fig. 9, like Fig. 6, the tapered wave guide section is preferably eccentrically positioned with respect to the walls of the box, the position in Fig. 9 being nearer to the upper right-hand corner (as seen in this view) than to any other corner of the nearest wall. In this instance, as in Figs. 5–7, the tapered wave guide section communicating with the box is in the nature of a small electromagnetic horn directed across the box interior toward the opposite wall.

With the arrangement of the receiving and retransmitting units 16 and 17 on the bridge 11 of Fig. 1, the skipper of the approaching vessel sees a modified radar picture of the bridge (Fig. 3), whereon are provided two extensions 26 and 27, directed radially away from the center point 14 which represents the location of his craft, and joining the bridge representation line 15 at points thereon corresponding to the positions of the piers 12 and 13, respectively.

Each of the markers 26 and 27 is actually made up of a series of dots of graduated luminosity, a bright spot appearing just at the edge of the bridge representation 15 and a series of graduated dots of less luminosity extending away therefrom, as is seen more clearly at 26' and 27' in Fig. 4, which represents the picture on an enlarged scale as is provided when the skipper has approached closer to the bridge 11 and has switched the radar system to provide the magnified scale picture. In this representation in Fig. 4, the bridge pier markers 26' and 27' appear more extensive and their character as discontinuous lines is more apparent here. Also, the radial directions in which these markers extend outward from the bridge line 15 is strikingly apparent in Fig. 4.

With the illustrative dimensions of the echo box 20 and the coupling horn 21 therein, for operation for example at frequencies of the order of 10,000 megacycles (3 centimeter wavelength), relatively high energization of the box results during a typical radar pulse, i. e. one with a pulse length of the order of one-fourth microsecond to one microsecond, and the length of the markers 26 and 27 in Fig. 3 (or 26' and 27' in Fig. 4) is made to appear as of the order of 500 to 1000 feet, in terms of scalar representation.

These markers are thus sufficiently extensive to show up greatly in excess of the normal width of the bridge image line 15, and moreover energy reflections back and forth between the nearer and farther portions of bridge superstructure are insufficient to obscure the pier marks as achieved with the present system.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Craft guidance apparatus comprising a microwave metallic echo box, a directive antenna having an axis of directivity and a directivity pattern having appreciably greater angular breadth in one plane containing said axis than in the plane perpendicular thereto intersecting said one plane in said axis, said directive antenna comprising means for receiving recurrent radar pulses of microwave energy for transmission to and retransmission from said echo box; a wave guide conduit system intercoupling said echo box and said directive antenna, said wave guide conduit system including at one end a flared electromagnetic horn having its largest apertured end in electromagnetic communication with the interior of said echo box, the other end of said wave guide conduit being coupled to said antenna, the largest apertured end of said horn having an appreciable area relative to the volume of said echo box for rapid high level energization thereof by each received radar pulse, with accompanying relatively complete de-energization through said horn within a time interval less than the order of one microsecond after cessation of each received pulse.

2. Craft guidance apparatus as defined in claim 1 wherein the metallic echo box is in the form of a parallelepipedon.

3. Craft guidance apparatus as defined in claim 1, wherein said horn extends outward from a wall of said echo box, the aperture of the horn being within the plane of said wall.

4. In a system for craft navigation of a river or the like traversed by a bridge having a plurality of piers, a microwave radar pulse energy receiving and retransmitting device adapted to be attached to said bridge at one of said piers, said energy receiving and retransmitting device comprising a metallic echo box, a wave guide extending through one wall thereof and having a first end within said echo box and a second end external thereof, said first end being flared in a horn with an aperture area many times larger than the cross-sectional area of said wave guide for rapid high level energization of said echo box by a received radar pulse, with accompanying relatively complete de-energization through said horn within a time interval less than the order of one microsecond after cessation of each received pulse, and a directive antenna coupled to the second end of said wave guide, said directive antenna having an energy aperture whose height is appreciably greater than its width, said directive antenna having a radiation pattern concentrated in a narrow range of angles of elevation and having a horizontal spread of appreciable breadth.

5. In a system for craft navigation of a river or the like traversed by a bridge having a plurality of piers, a microwave radar pulse energy receiving and retransmitting device adapted to be attached to said bridge at one of said piers, said energy receiving and retransmitting device comprising a metallic echo box, a wave guide extending through one wall thereof and having a first end within said echo box and a second end external thereof, said first end being flared in a horn with an aperture area many times larger than the cross-sectional area of said wave guide for rapid high level energization of said echo box by a received radar pulse, with accompanying relatively complete de-energization through said horn within a time interval less than one microsecond after cessation of each received pulse, and a directive antenna coupled to the second end of said wave guide, said directive antenna comprising a reflector having a concave surface conformal to a paraboloid, the height of said reflector being appreciably greater than its width, and means at the second end of said wave guide for cooperating with said concave surface reflector to provide an overall antenna radiation pattern concentrated in a narrow range of angles of elevation and having a horizontal spread of appreciable breadth.

6. In combination, a metallic echo box, a microwave energy conduit extending through one wall thereof and having a first end within said echo box and a second end external thereof, said first end including a horn communicating with said echo box through an aperture having an area many times larger than the cross-sectional area of said conduit to establish a ring-time for said echo box of less than the order of one microsecond, a directive antenna coupled to said second end of said energy conduit, said directive antenna comprising a reflector having a concave surface conformal to a paraboloid, and means for securing said echo box and said reflector to a bridge over navigable water at a point thereon significant as to a safe line of travel thereunder, the height of said reflector being appreciably greater than its width, and means at said second end of said conduit for receiving recurrent pulses of microwave energy substantially at the focus of said reflector and for emitting energy therefrom to said reflector, said last-named means comprising a horn having its aperture located substantially at the focus of said reflector, said horn being directed toward the reflector.

References Cited in the file of this patent

UNITED STATES PATENTS

| Number | Name | Date |
| --- | --- | --- |
| 2,461,005 | Southworth | Feb. 8, 1949 |
| 2,463,474 | Busignies | Mar. 1, 1949 |
| 2,471,419 | Edson et al. | May 31, 1949 |
| 2,510,299 | Schramm | June 6, 1950 |
| 2,518,383 | Schelkunoff | Aug. 8, 1950 |
| 2,534,271 | Kienow | Dec. 19, 1950 |
| 2,537,139 | Kannenberg et al. | Jan. 9, 1951 |
| 2,539,511 | Hansen et al. | Jan. 30, 1951 |
| 2,548,655 | Cutler | Apr. 10, 1951 |
| 2,572,088 | Young et al. | Oct. 23, 1951 |
| 2,596,190 | Wiley | May 13, 1952 |